US005545456A

United States Patent [19]
Suida

[11] Patent Number: 5,545,456
[45] Date of Patent: Aug. 13, 1996

[54] WASH-CLOTH THAT CLEANS AND MASSAGES

[76] Inventor: Teresa Suida, 459 Woodward Ave., Ridgewood, N.Y. 11385

[21] Appl. No.: 425,382

[22] Filed: Apr. 20, 1995

[51] Int. Cl.$^6$ .......................... A47K 7/02; A61H 15/00; B32B 1/04; B32B 3/02

[52] U.S. Cl. .......................... 428/76; 15/208; 15/222; 401/8; 601/112; 601/113; 601/137; 428/88; 428/161; 428/166; 428/212

[58] Field of Search .......................... 428/72, 76, 88, 428/161, 166, 212; 15/208, 222; 401/8; 601/113, 137, 112

[56] References Cited

U.S. PATENT DOCUMENTS 1,681,031 8/1928 Forbis .
2,006,708 7/1935 Benedict .
2,669,737 2/1954 Evans .
2,817,865 12/1957 Arioll .
4,154,542 5/1979 Rasmason .
4,240,760 12/1980 Levine .
4,457,643 7/1984 Canigilia .
4,789,262 12/1988 Sanchez .
5,022,517 6/1991 Benitez .
5,326,610 7/1994 Moss .

*Primary Examiner*—James D. Withers
*Attorney, Agent, or Firm*—Michael Marinangell

[57] ABSTRACT

The present invention relates to an improved wash-cloth having a plurality of pockets for the simultaneous insertion of soap and/or massaging utensils and other medicating items. The pockets can be secured so that any items inserted in the pockets will not be dislocated during use. In addition, the wash-cloth of this invention has gripping handles intergrally knit to the opposing ends of the main body. These handles are held so that wash-cloth can be safely and easily used, particularly by handicapped persons, to effectively clean and massage the back and other difficult to reach areas. One type of massaging utensil is shown and has two apertured balls, which are held together by knotting a length of material that passes through an apertured rod inserted through the aperture of the massaging balls.

4 Claims, 2 Drawing Sheets

WASH-CLOTH THAT CLEANS AND MASSAGES

FIELD AND BACKGROUND OF THE INVENTION

The present invention generally relates to an advanced wash-cloth and more particularly to an improved wash-cloth having a plurality of built in pockets for the simultaneous placement therein of both soap bars and massaging devices. In addition, the wash-cloth of this invention has gripping handles intergrally knit to the opposing ends of the main body. These handles are held so that wash-cloth can be safely and easily used, particularly by tall, overweight, or disabled persons, to effectively clean and massage the back and other difficult to reach areas. This wash-cloth is helpful to many handicapped people who are unable to use a bar of soap separately from a wash-cloth.

Cleanliness is a must. People have sought, throughout the centuries, to clean and bath himself as effectively and comfortably as possible. Until now, however, many people have not been able to both safely and comfortably clean their backs. Not only will the instant invention now let a person easily clean their backs, but it will allow the user to simultaneously massage the same area. Although numerous prior art was uncovered in this field, including U.S. Pat. Nos. 5,326,610 granted to Moss in 1994, U.S. Pat. No. 5,022,517 granted to Benitez in 199; U.S. Pat. No. 4,789,262 granted to Sanchez in 1988; U.S. Pat. No. 4,457,643 granted to Caniglia in 1984; U.S. Pat. No. 4,240,760 granted to Levine in 1980; U.S. Pat. No. 4,154,542 granted to Rasmason in 1979; U.S. Pat. No. 2,817,865 granted to Arioli in 1957; U.S. Pat. No. 2,669,737 granted to Evans in 1954; U.S. Pat. No. 2,006,708 granted to Benedict in 1935; and U.S. Pat. No. 1,681,021 granted to Forbis in 1928, none can be so effectively used to both clean and massage the body's backside as can be safely be done while bathing with the device disclosed and claimed herein.

Unlike the improved device disclosed herein, the above listed prior art wash-cloths having soap pockets generally require the user to use his or her hands to keep the soap in the pocket. Additionally, none of these prior wash-cloths have a plurality of pockets made sufficiently deep and having a retaining means to aid in the retention of a bar of soap until it is entirely used. Furthermore, the plurality of retaining pockets in the present invention allows for the simultaneous retention of massaging devices. In addition, the wash-cloth of the present invention has attached at opposite ends of the main body, handles which will allow the bather to easily and safely lather and massage his or her backside and other hard to reach places. Although seemingly simple in design and low in cost no prior device can accomplish the clearly effective results of the instant invention.

OBJECTS OF THE INVENTION

The object of this invention is to provide a wash-cloth with handles which will allow a person to simultaneously clean and massage their back and other hard to reach areas on their body in a safe and effective manner.

Another object of the present invention is to provide a wash-cloth which will lessen the chance of injury, especially to tall, overweight and disabled people, while bathing since the need to bend and turn is lessened.

A further object is to provide a wash-cloth having a plurality of pockets that can be filled with soap and/or massaging utensils and then firmly secured for use.

Another object of the present invention is to provide a wash-cloth in a bar of soap will remain secured in the pockets until it is finished.

An additional object of the present invention is to provide a wash-cloth having a plurality of soap and massaging utensil pockets which is inexpensive to manufacture and which will thus bring beneficial results to many people at little cost.

Other objects and features of the invention will become apparent to those skilled in the art from the following detailed description of a preferred embodiment of the invention as shown in the following Figures.

BRIEF DESCRIPTION OF THE DRAWINGS

The invention will appear more clearly when taken in conjunction with the accompanying drawing showing, by way of example, one preferred embodiment of the inventive concept, in which.

DESCRIPTION OF THE INVENTION IN A PREFERRED EMBODIMENT

Figure 1:
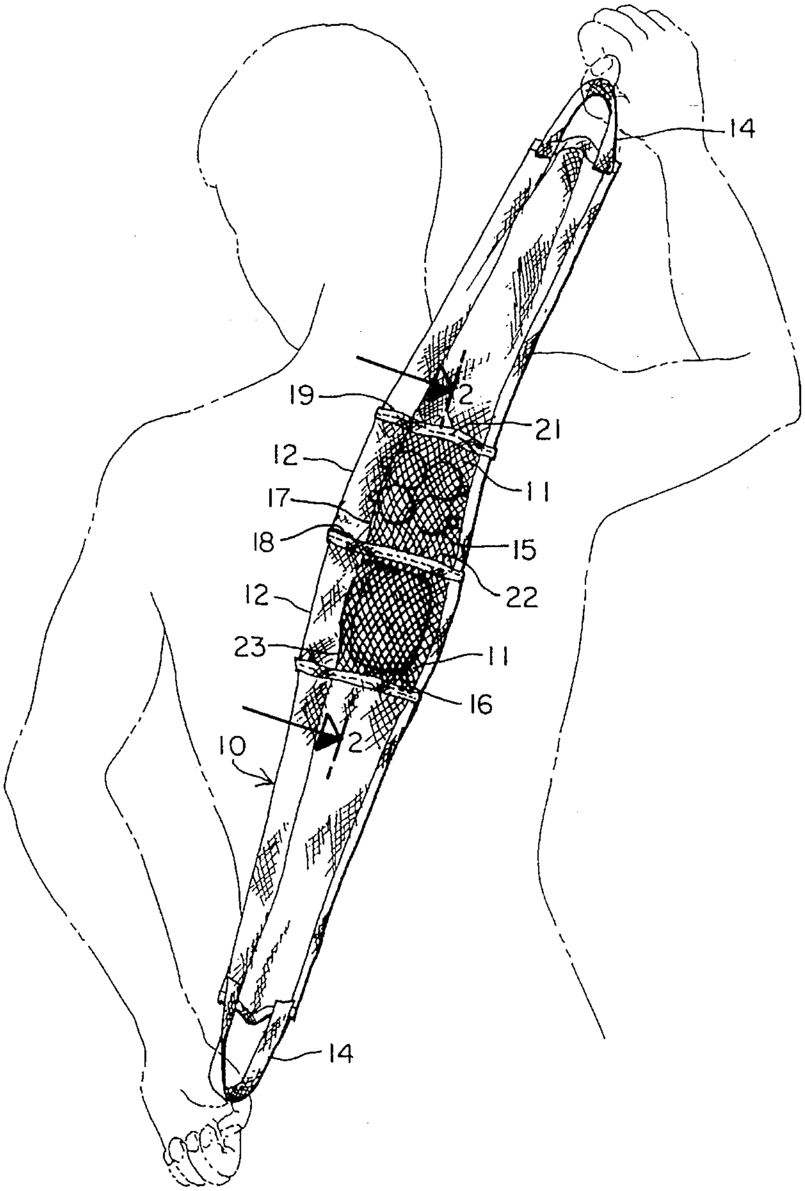
FIG. 1 is a perspective view of one preferred embodiment of the improved wash-cloth constructed in accordance with the objects of this invention wherein the wash-cloth has two pockets for securing a bar of soap bar and massaging utensils.

Referring now in greater detail to the embodiment shown in FIG. 1 of the drawings, the main body of the wash-cloth is designated with the reference numeral 10. The wash-cloth 10 has, as shown in this preferred embodiment, two pockets, both designated with the number 11. Each pocket 11 has at its open end a securing flap 12 and a securing means 13 for retaining items securely within the pocket 11 while bathing.

Figure 2:
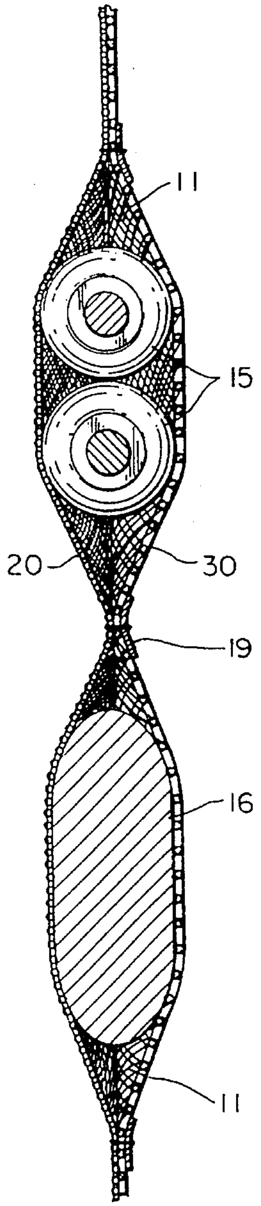
FIG. 2 is a view taken through 2—2 of FIG. 1 wherein a bar of soap 1 is retained in one pocket while massaging utensils are retained in the other pocket. Also shown is the differing material coarseness on opposing sides of the main body of the wash-cloth.

In attaining the above listed objectives, the instant wash-cloth 10 is made from any suitably flexible material having an effective yet comfortable degree of porosity, coarseness and abrasiveness. The main body of the wash-cloth 10 can be made of any suitably flexible material such as terry cloth, turkish bath towel, Jute TM, nylon, cellulose sponge or cotton. In the side view of the wash-cloth body 10, shown in FIG. 2, a combination of two materials having different porosities 20 and 30, are used on either side. These materials are selected from the above listed flexible materials. In this way the user can clean with the side having the smoother and less porous side, (in FIG. 2 this is the side of the wash-cloth 10 made of material designated as number 20), and then turn the wash-cloth 10 over so as to massage and scratch his or her backside with the side of the wash-cloth 10 made of the more porous material (designated as 30).

The wash-cloth body 10 has on one side a plurality of intergrally knit, and centered receiving pockets 11. The securing flaps 12 of the pockets 11 are intergrally formed at one end of each of the pockets 11, which are also intergrally formed on the main body of the wash-cloth 10. In the disclosed embodiment, the pockets 11 are made of a single piece of the same material as the main body 10, the single piece of material being transversely slit near one end on either side of the center line to form a securing flap 12 for the pocket 11 integral with said pocket at two points. The severed edge forming the securing flap 12 for the pocket 11 is stitched to the main body of the wash-cloth 10 and the flap 12 turned down over the severed but unstitched edge of the pocket 11. The opposite edge of the pockets as well as the adjacent sides thereof and the superposed sides of the pocket 11 and flap 12 are then stitched to the main body 10.

The receiving pockets 11 on one side of the main body 10 are made from the same material as the main body of the wash-cloth 10. The pockets 11 are formed from a single rectangular retaining member which is transversely slit along a line 17 between the points 18 and 19 and adjacent one end to form the securing flap 12. The opposite end of the pocket 11 is also stitched to the main body of the wash-cloth 10, the stitching being sewn upwardly along the lines 21 and 22 at the sides of the pocket 11 and further continued to fasten the sides of the superposed securing flap 12 as well as the sides of the pocket 11 to the main body 10. The entrance to said pockets 11 are along the unstitched edge 23 thereof. By bringing the edge of the securing flap 12 close to the stitching points 18–19 of the pockets 11, the bar of soap 16 and the massaging utensil 15, when inserted in the pockets 11, as shown in FIG. 1, are substantially prevented from slipping out when the wash-cloth 10 is in use. Not only does the securing flap 12 hinder the dislocation of any inserted items, but securing means 13, attached on the flap 12, keeps the soap 16 in place until totally used. Although velcro was used as the securing means 13 on the flap 12, in the disclosed preferred embodiment, because it is least likely to cause discomfort and abrasions when pressing the wash-cloth 10 against the body, other known securing means such as buttons or zippers can be used if properly covered. To prevent sagging of the pockets 11, after continued use, the four corners thereof, as well as the corners of the end of the securing flaps 12, are locked stitched.

Figure 3:
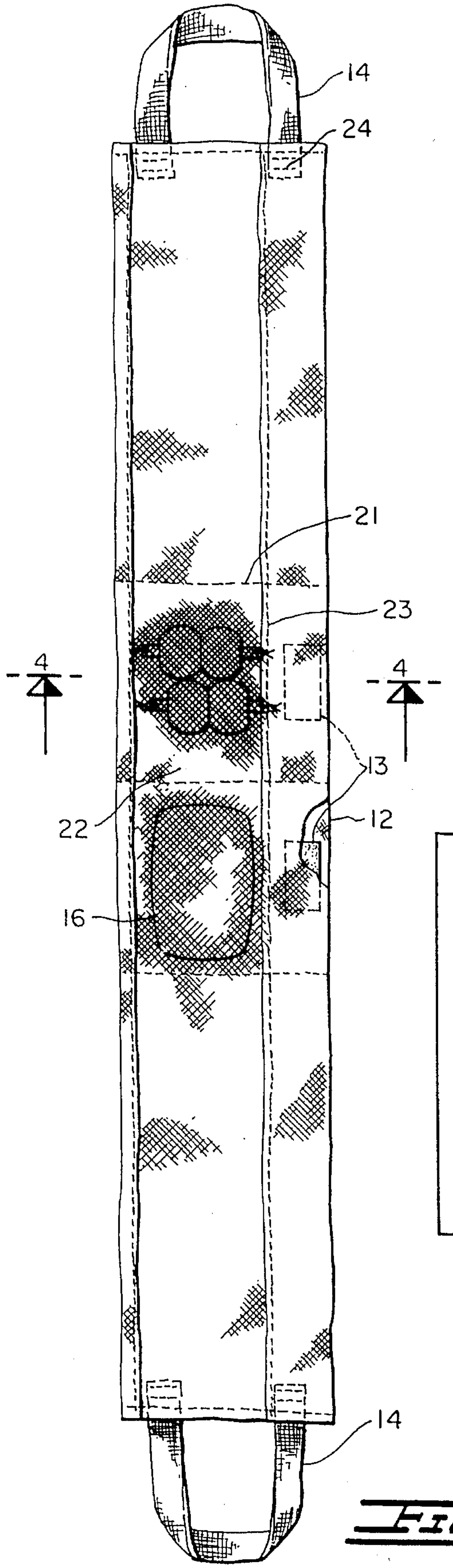
FIG. 3 is a front perspective view of the wash-cloth having the gripping handles on opposing ends, and two pockets having retaining means to contain the soap and massaging utensils.

As pictured in FIG. 3, handles 14 are intergrally attached at points 24 on the opposing ends of the body of the wash-cloth 10. As is shown in FIG. 1, these handles 14 can be easily held by a person to both clean and massage their back. Although, as illustrated, the main body of the wash-cloth 10 is preferably rectangular in shape, other shapes and sizes can also be used as long as they are configured to contain a plurality of pockets and is of a sufficient length so that the handles 14 can be easily attached on opposing ends of the main body 10 allowing a bather to easily and safely clean and massage his or her back.

Figure 4:
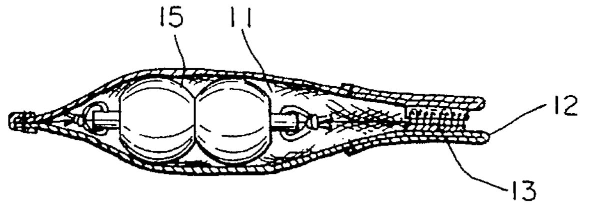
FIG. 4 is a side view taken through 4—4 of FIG. 3 of one embodiment of a massaging utensil as it is retained in the wash-cloth pocket by a velcro securing means on the pocket flap.
Figure 5:
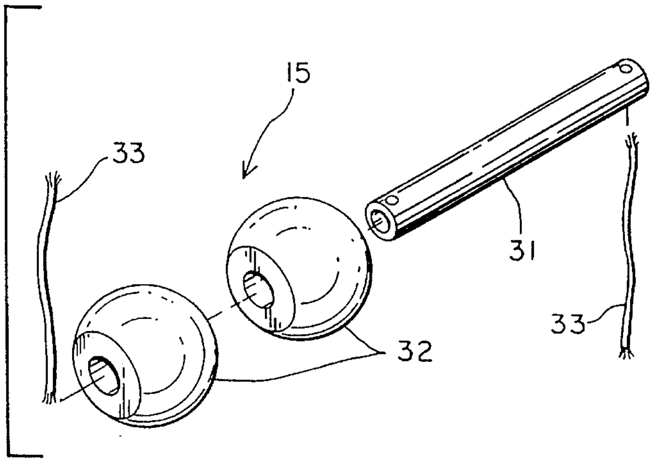
FIG. 5 is an exploded view of the massaging utensils of FIG. 4.

In FIG. 4, one type of massaging utensil is shown as it is retained in the wash-cloth pocket 11 by a velcro securing means 13 on the pocket flap 12. FIG. 5 shows this massaging utensil 15 as being comprised of 2 apertured massaging balls 32. An apertured rod 31 is passed through the aperture of the massaging balls 32 and the combination is held together by knotting together a piece of material which is passed through the aperture in the rod. Unattached massaging balls 32 can also be secured in the retaining pockets 11 by the flap 12 and the selected securing means 13. In addition to a bar of soap 16 and a massaging utensil 15, a handicapped bather may insert ice or other medicative composition for aiding them in contacting and thus medicating an injured area of their back.

The use of the improved wash-cloth 10 described above and claimed below is easily accomplished by inserting into the wash-cloth pockets 11 a massaging utensil 15, a bar of soap 16, and any other item that they may require. This is done by lifting the unstitched edge 23 of the securing flap 12 upwardly away from the main body 10 and pulling downwardly on the unstitched edge 23 of the pocket 11. After the needed items are inserted into pockets 11 they are secured therein by pulling downwardly on the unstitched edge 23 of the the securing flap 12. The securing means 13 on the flap 12 are then engaged so that anything inserted in the pocket 11 will not be dislodged. The bather then takes a hold of each of the handles 14 so that they can wash and simultaneously massage their backs without having to bend and strain. Under normal conditions the bar of soap 16 is completely used and there is thus no small, formerly discarded pieces of soap.

Although seemingly simple in design and inexpensive to construct, there is no prior art or device which anticipates or makes obvious the present wash-cloth which can be used to wash and massage the user's back and other previously hard to reach areas of the body.

Since the invention is described and illustrated with reference to but a single preferred embodiment, and since numerous modifications and changes may become readily apparent to those skilled in the art after reading this disclosure, it should be understood that I do not wish to limit the scope of my invention to the exact configuration described above and claimed by me below.

What is claimed by me is:

1. A wash-cloth comprising a main body of rectangular shape comprising two sheets of flexible material of differing porosity, coarseness and abrasiveness, said sheets being integrally secured together to form the main body;

a plurality of retaining pockets, said pockets being integrally attached onto one sheet of the main body and centrally located along the length of the main body;

a securing flap integrally attached to one end of each of the retaining pockets;

securing means attached to each flap for securing the flap on the pocket and retaining a bar of soap and a massaging utensil inside the pockets; and two handles, said handles being integrally attached to opposing ends of the main body of the wash-cloth.

2. The wash-cloth of claim 1 wherein the two sheets of flexible material forming the main body of the wash-cloth are selected from the group consisting of terry cloth, turkish bath towel, jute cloth, nylon cloth, cellulose sponge and cotton cloth.

3. The wash-cloth of claim 2 wherein the securing means is selected from the group consisting of velcro, buttons and zippers.

4. The wash-cloth of claim 1 wherein the main body of the wash-cloth is square.

* * * * *